United States Patent
Holt et al.

(10) Patent No.: US 7,590,467 B2
(45) Date of Patent: Sep. 15, 2009

(54) SPINDLE SYSTEM, APPARATUS, AND METHODS FOR APPLYING SPINDLE APPARATUS

(75) Inventors: Mary Rece Holt, Fremont, WI (US);
Pau-Lin Pawar, Appleton, WI (US);
Oliver P. Renier, Green Bay, WI (US);
Peter D. Honer, Larsen, WI (US);
Frank F. Kromenacker, Appleton, WI (US); John Oyler, Horsham (GB);
James Winder, Meopham (GB);
Christopher Barham, Northfleet (GB)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 308 days.

(21) Appl. No.: 11/443,573

(22) Filed: May 31, 2006

(65) Prior Publication Data

US 2006/0217820 A1 Sep. 28, 2006

Related U.S. Application Data

(63) Continuation of application No. 11/041,853, filed on Jan. 24, 2005, now Pat. No. 7,085,618.

(51) Int. Cl.
*G06F 17/00* (2006.01)
*B65H 49/18* (2006.01)

(52) U.S. Cl. .................. 700/236; 700/244; 702/163; 705/28; 242/599; 242/912

(58) Field of Classification Search .............. 705/28; 73/156, 159; 242/598.3, 599, 912; 700/139, 700/236, 244; 702/163
See application file for complete search history.

(56) References Cited

U.S. PATENT DOCUMENTS

| | | | |
|---|---|---|---|
| 3,991,692 A | | 11/1976 | Papajewski et al. |
| 4,013,944 A | | 3/1977 | Benya et al. |
| 4,151,403 A | | 4/1979 | Woolston |
| 4,237,539 A | * | 12/1980 | Piovoso et al. ............... 702/35 |
| 4,286,487 A | | 9/1981 | Rubel |
| 4,359,382 A | | 11/1982 | Morgan et al. |
| 4,620,184 A | | 10/1986 | Nedstedt |
| 5,036,472 A | * | 7/1991 | Buckley et al. ............. 700/233 |
| 5,109,783 A | | 5/1992 | Shimizu |
| 5,177,446 A | | 1/1993 | Boriani et al. |
| 5,280,274 A | | 1/1994 | Uemura et al. |
| 5,322,028 A | | 6/1994 | Hashiride et al. |
| 5,608,643 A | * | 3/1997 | Wichter et al. ............. 700/244 |
| 5,671,362 A | * | 9/1997 | Cowe et al. .................. 705/28 |
| 5,691,919 A | | 11/1997 | Gemmell et al. |

(Continued)

*Primary Examiner*—Andrew Joseph Rudy
(74) *Attorney, Agent, or Firm*—Dority & Manning, P.A.

(57) ABSTRACT

A system, apparatus and method collects data on rolled product usage at a dispensing location by monitoring the amount of product pulled or removed from a roll. A spindle assembly may be configured to support a product roll. The spindle assembly includes a rotating member disposed about a sensor. The sensor is capable of detecting one or more parameters of product usage from the roll. Furthermore, the sensor may be configured to measure at least the degree of movement of the rotating member during removal of product from the roll. A recording device also may be provided for receiving data from the sensor, the recording device being adapted for receiving and recording data. Data that may be generated, and may be recorded, includes roll product usage data. An electronically controlled system of monitoring product inventory, and/or ordering more product when inventory falls below a predetermined threshold amount is also included.

19 Claims, 16 Drawing Sheets

U.S. PATENT DOCUMENTS

| | | | |
|---|---|---|---|
| 4,097,726 A | 6/1998 | Satoh et al. | |
| 5,819,981 A * | 10/1998 | Cox | 221/2 |
| 5,839,585 A | 11/1998 | Miller | |
| 5,865,322 A | 2/1999 | Miller | |
| 5,878,381 A | 3/1999 | Gemmell et al. | |
| 5,918,197 A | 6/1999 | Toussant et al. | |
| 5,947,302 A | 9/1999 | Miller | |
| 6,002,344 A * | 12/1999 | Bandy et al. | 340/10.2 |
| 6,012,834 A * | 1/2000 | Dueck et al. | 700/238 |
| 6,022,207 A | 2/2000 | Dahlin et al. | |
| 6,059,222 A | 5/2000 | Yuyama et al. | |
| 6,092,478 A | 7/2000 | Simakrai et al. | |
| 6,092,726 A | 7/2000 | Toussant et al. | |
| 6,093,027 A | 7/2000 | Unger et al. | |
| 6,101,447 A | 8/2000 | Poe, Jr. | |
| 6,183,456 B1 | 2/2001 | Brown et al. | |
| 6,213,424 B1 | 4/2001 | Helfer-Grand | |
| 6,317,650 B1 * | 11/2001 | Powell et al. | 700/236 |
| 6,341,522 B1 * | 1/2002 | Goss et al. | 73/159 |
| 6,360,181 B1 | 3/2002 | Gemmell et al. | |
| 6,529,591 B1 * | 3/2003 | Dosani et al. | 379/106.03 |
| 6,573,318 B2 * | 6/2003 | Duvall et al. | 524/131 |
| 6,892,941 B2 * | 5/2005 | Rosenblum | 235/383 |
| 6,996,538 B2 * | 2/2006 | Lucas | 705/28 |
| 7,035,818 B1 * | 4/2006 | Bandy et al. | 705/28 |
| 7,444,203 B2 * | 10/2008 | Rosenblum | 700/235 |

* cited by examiner

SPINDLE SYSTEM, APPARATUS, AND METHODS FOR APPLYING SPINDLE APPARATUS

RELATED APPLICATIONS

The present application is a continuation application of and claims priority to U.S. patent application Ser. No. 11/041,853, filed Jan. 24, 2005 now U.S. Pat. No. 7,085,618.

BACKGROUND OF THE INVENTION

Measuring the amount of product dispensed from a rolled product dispenser is quite useful for many industries. For example, manufacturers of rolled sheet products such as wrapping paper, toilet paper, paper towels, and the like frequently need to determine the amount of material removed from rolls. In the deployment and sale of cording, rope, string, ribbon, chain, and other elongated products, dispensing rolls are frequently used. When dispensing rolls are employed, such rolled products may be utilized in manufacturing operations or in a retail environment. The need to accurately and reliably track dispensing activity is important.

In the paper industry, consumer behavior may be studied by observing usage patterns experienced by consumers when various grades or types of paper products are presented for use. For example, calculating the amount of pulls per event, the average length or number of perforated paper units taken for each dispensing event, and the number of pulls that may be employed to deplete each roll, as just a few examples, can be quite useful for market researchers. Thus, there is a need for improved apparatus, systems, and methods for collecting such data, and making such data available to market researchers or others concerned with the amount of product that is depleted or dispensed.

U.S. Pat. No. 5,878,381 discloses a system and method for collecting data on individual and aggregate use of toilet tissue or other rolled absorbent paper in a public washroom. The apparatus includes a modified dispenser for releasing paper from a large roll, with internal mechanisms including a magnetic movement detector, and a control unit. These mechanisms are mounted adjacent to the roll beneath a housing. Thus, according to the teachings of the patent, a toilet stall in a public washroom may be modified by placing a sensor on the stall door to detect the presence of a person in the stall.

A significant limitation to the apparatus shown in the U.S. Pat. No. 5,878,381 is that the apparatus shown therein is relatively expensive. Typically, it requires significant and extensive modifications to a restroom stall to employ the system. Further, consumer research has shown that product usage patterns are quite different at home than in public restrooms, so the consumer behavior exhibited in the public stall may not closely match consumer home usage patterns of behavior.

Additionally, the data collected when using the apparatus of some prior art systems is limited in usefulness by the fact that such data is based upon timed use periods. Timed use periods sometimes cannot readily provide needed data on the number of individual sheets (or length) depleted for each separate and individual pull.

U.S. Pat. No. 5,691,919 discloses a system and method for collecting data on individual and aggregate use of rolled tissue products. This patent is related to U.S. Pat. No. 5,878,381 and contains essentially the same disclosure.

What is needed in the industry is a system, method and apparatus for accurately detecting and recording the amount of a rolled product dispensed to a user. A system is needed that is capable of providing more than merely a time window for data collection, but instead may be capable of directly measuring the feeding of product by evaluating and/or recording separate, identifiable, measured pulling events. An apparatus or method that facilitates direct measurement of product usage by detecting of rotation of a supply roll, storing relevant data, and then displaying or using the data in a useful format for study or inventory control would be desirable.

SUMMARY OF THE INVENTION

In the invention, a system is provided for collecting data on product usage from a product roll by monitoring the amount of product pulled or removed from a roll. In the invention, a spindle assembly may be configured for attachment or suspension of a product roll. The spindle assembly may comprise a rotating member as well. Furthermore, an emitter and a sensor means may be provided for connection to the spindle, the emitter and sensor together being capable of detecting one or more parameters of product usage from a roll. In some applications, data collected will include a date and time stamp when a pull is completed from the roll. Furthermore, the sensor may be adapted for measuring the degree of movement of the rotating member during removal of product from the roll.

A recording device optionally may be provided for communication with the sensor. However, not all applications of the invention use a recording device, and the data could simply be sent for output as a signal to achieve some purpose related to monitoring supply or exhaustion of a roll. When a recording device is used, the recording device may be adapted for receiving and recording data, including for example, roll product usage data such as length, time and date at the dispensing location.

The system also optionally may include one or more microprocessors, in communication with or even within the spindle assembly. Also, switches of various types (electrical, magnetic, optical, mechanical) may be employed to sense the degree of rotation of a rotating member relative to the spindle assembly. In some embodiments, one or more switches can be employed to generate a signal. Essentially any device that is capable of optically or mechanically or otherwise in some other manner sensing rotational movement could be employed in the invention.

A method for tracking usage of perforated sheet material dispensed from a roll is also provided in one embodiment of the invention. The method includes obtaining data related to rotation of a spindle apparatus, converting that data to a length of material pulled, and then calculating or tabulating various parameters or values from said data. The parameters tabulated may include the number of units per event, the number of pulls per event, the number of pulls per roll, the number of units per day, the number of events per day, the frequency of events per time of day (hour), the frequency of the number of units per time of day; the number of units per hour, the time interval between pulls, the frequency of time interval between pulls, the frequency and/or length of pull.

A method for replenishing an inventory of product dispensed from rolls is provided in one aspect of the invention. This could occur by a signal or message being sent upon the recognition that a low supply level has been observed. Furthermore, a method for tabulating and billing a customer for the amount of rolled product material a customer consumes in a given period of time is provided in another aspect of the invention. Many options are available to a person of skill in the art using the process, system and/or apparatus of the invention.

BRIEF DESCRIPTION OF THE DRAWINGS

A full and enabling disclosure of this invention, including the best mode shown to one of ordinary skill in the art, is set forth in this specification. The following Figures illustrate the invention.

DETAILED DESCRIPTION OF THE INVENTION

Figure 1:
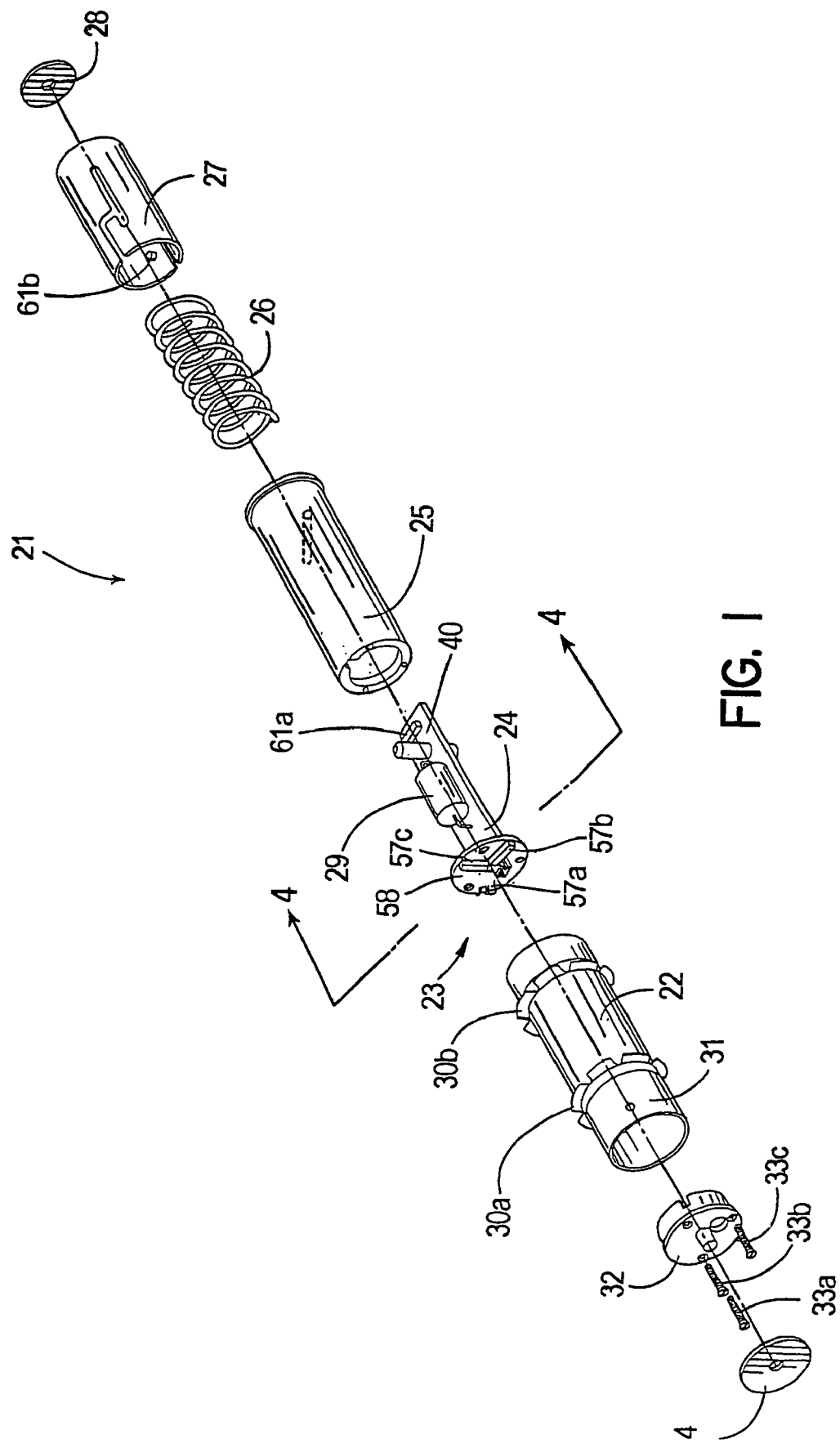
FIG. 1 is an exploded view of the spindle system apparatus of the invention.

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

In general, the apparatus of the invention does not depend only upon recording time intervals to determine the utility of a web, tissue or paper product. The apparatus is shown in several FIGS. 1-4 below. In most cases each pull of product from the roll having the spindle within the roll enables the calculation for that pull of the amount of product removed in that one particular pull. In this way, it is possible to generate many data points in a test, for each and every pull, thereby strengthening the statistical interpretations of the result. One valuable feature in one embodiment of the invention is a date and time stamp that correlates each pull with a date and time, thereby recording data points for future use. The reliability of data obtained using the invention may be improved.

As the spindle outer tube rotates, embedded emitters pass over receiving portions of a sensor that are connected to the primary electronics. Essentially any method could be used for emitting a signal and receiving the signal by a sensor, such as for example, mechanical, optical, or electrical or magnetic.

In one magnetically oriented embodiment of the sensing apparatus, there are four magnets (which serve as emitters) arranged in 90° intervals around the outer tube and three switches (which serve as the sensors) arranged at 120° intervals around the inner tube. Since the inner tube remains stationary when the outer tube rotates, there are 12 pulses or counts (in one embodiment) presented to the electronics for every full rotation of the outer tube. Other combinations of the invention having more or less switches and magnets can be used as well.

When the spindle rotates the electronics detect pulses generated by the emitter/sensor combination. Pulses are counted in the firmware. At a preset time interval after the spindle stops rotating (nominally 2 seconds) the counts measured are time stamped and stored in memory. Control of this preset time interval gives greater or lesser sensitivity to the determination of one removal event. The relative direction of rotation can be determined by the firmware and, and such data is recorded with each event.

If the spindle rotates in one direction and then in the opposite direction before the preset time interval lapses then only the difference in counts is stored. Sensitivity to the minimum number of counts that will be recorded as an event can be programmed into the spindle software, nominally events of 1 count are ignored but this minimum rotation signal is adjustable. Sensitivity is further adjustable by varying the number of sensors/emitters actually employed in the spindle assembly. In one embodiment, using magnetic sensing means with three equally spaced sensors and four equally spaced magnets, a spindle is capable of detecting a maximum speed of about 25 rotations in 1 second (1500 rpm).

A roll change is determined through the spring end being depressed as if the spindle is placed into a roll holder. If the spring end is depressed by more than 5 mm this is detected by the electronics and a roll change event placed into memory.

The amount of tissue pulled may be calculated from the number of rotations of the barrel, for example, as shown below.

$$\text{Tissue Length, TL, at } k_{th} \text{ rotation} = \pi[D - 2(k-1)T]$$

Where:

k=the rotation number

D=Initial outer diameter of the roll

T=Effective thickness of rolled material $$T = \left( \frac{\pi D^2}{4} - \frac{\pi d^2}{4} \right) \bigg/ (N * L)$$

Where:
d=Outer diameter of core
N=Number of product units in a roll
L=Predetermined Length of a product unit For products that have several winds around the core at the same diameter from the core, such as cord or yarn, the equation could easily be modified by adding a multiplier indicating the number of winds across the core.

A software program employing the above equation makes it possible to calculate, using a microprocessor, certain parameters that are useful data points for determining the amount of product removed during dispensing events, the number of product removals (i.e., pulls) for each event, the number of pulls per roll, and the time interval between pulls. Furthermore, it is possible to determine the number of dispensing events and individual pulls which are required to exhaust a roll. Then, the data may be stored, and later used, as further discussed below in connection with FIGS. 5-13.

Turning now to FIG. 1, a spindle assembly 21 is shown in exploded view for easy identification of components and subcomponents in the spindle system 21. A rotating member 22 has grips 30a-b on its outer surface which engage the inner surface of a core or roll that is to be dispensed. A sensor 23 is operably connected to a strut 58, which in turn is located upon circuit board 40 having a recording device 24, which may also include a circuit board having a microprocessor (shown in FIG. 5). Sensor 23 could be comprised of mechanical, optical, electrical, vibrational, or some other means for sensing and/or measuring rotation. In this particular embodiment, shown in the Figures, the sensor 23 is magnetically operated, as further discussed below.

Battery 29 provides power to the spindle system 21. A relay 61 a is shown near the battery. A barrel 25 of the spindle assembly 21 fits over a recording device 24 and includes on its interior a spring 26 which is bounded by spring housing 27 (including as well a magnet 61b) and a friction pad 28 which provides stabilization of the spindle assembly 21 in a product holder preventing rotation of the barrel 25 as the product roll 46 and rotating member 22 rotate. The friction pad 28 is located on the end of the spindle assembly 21. Located at the end of the circuit board, is strut 58 with three switches 57a-c arranged 120° apart. The barrel 25 is closed on one end by an end cap 32, with screws 33a-c holding the end cap 32 upon the barrel 25. Furthermore, a second friction pad 34 covers the end cap 32 onto strut 58 which is mechanically locked into barrel 25.

Figure 2:
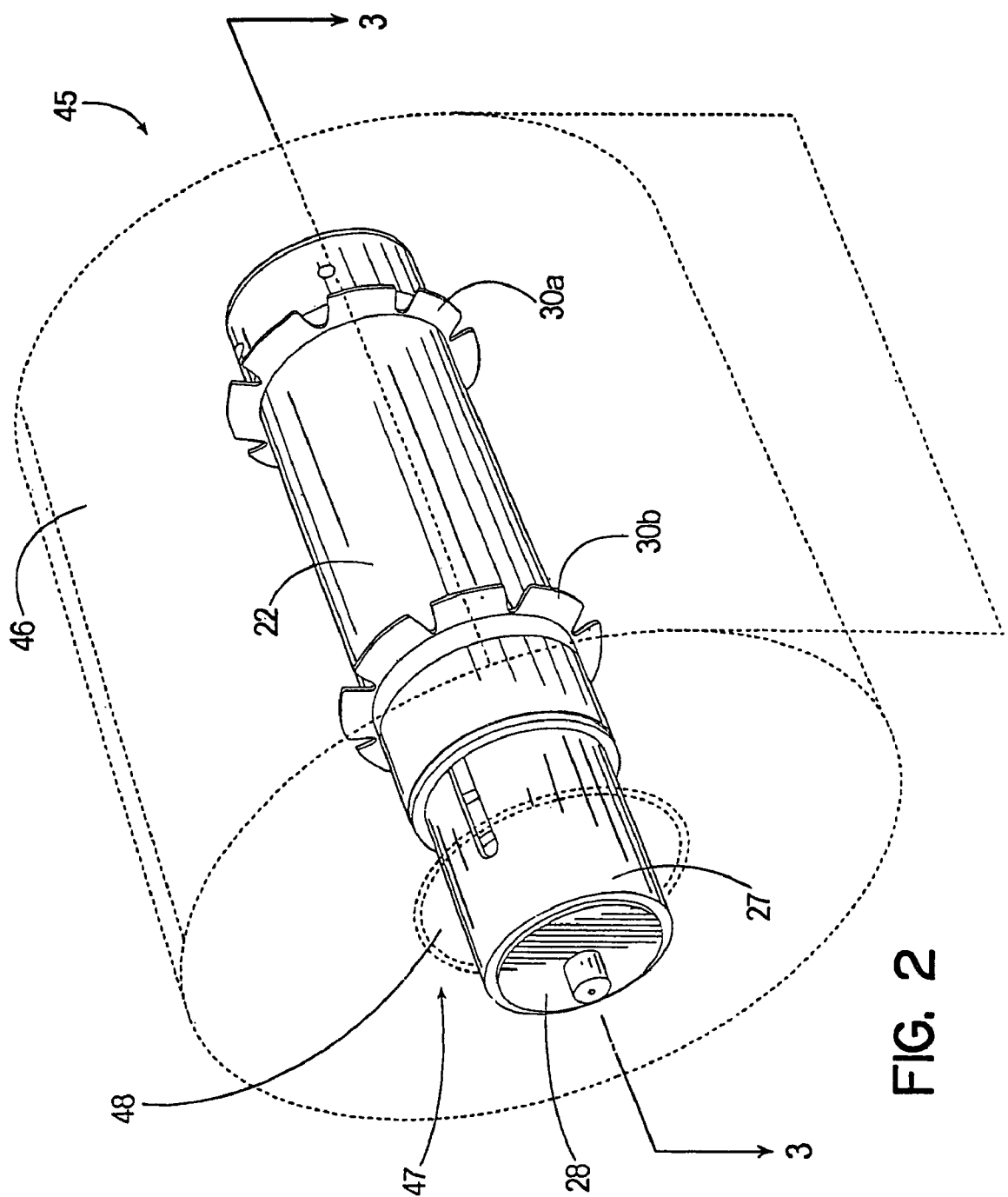
FIG. 2 shows a perspective operational view of the spindle as it is employed within the core of a product roll.

In FIG. 2, an operational view 45 is seen comprising a spindle 47 within the core 48 of a roll 46. The spring housing 27 is shown near the left side of FIG. 2, with the rotating member 22 having grips 30a-b on its exterior. Grips 30a-b are designed to frictionally engage an internal surface of a core (core internal surface is not shown in FIG. 2).

Figure 3:
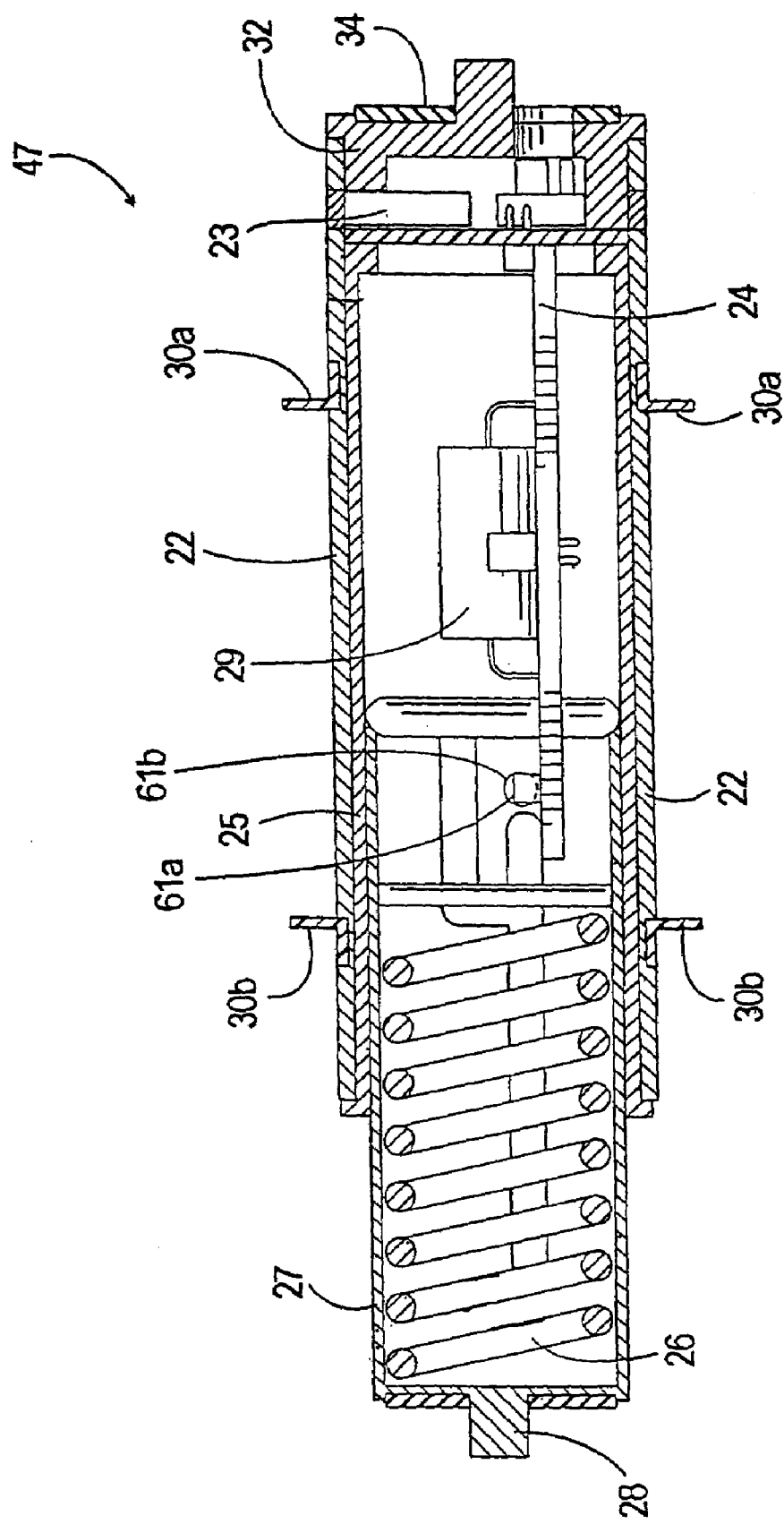
FIG. 3 is a cross sectional view of a spindle as taken along lines 3-3 of FIG. 2.

In FIG. 3, a cross section along the length of the spindle 47 taken along the lines 3-3 of FIG. 2 is shown. In the cross section, starting at the right side of spindle 47 is a friction pad 34 which is adjacent end cap 32. The sensor 23 is located near the right end of the spindle, operably connected to the recording device 24, with a battery 29. A relay 61a is shown surrounded by magnet 61b. The rotating member 22 may be seen on the upper and lower portions of the cross section. A spring 26 is shown on the left side of the Figure, and grips 30a and 30b are shown in cross section on the exterior surface of the rotating member 22. A friction pad 28 is shown on the far left side of the Figure, which encloses the spring housing 27 at its distal end.

Figure 4:
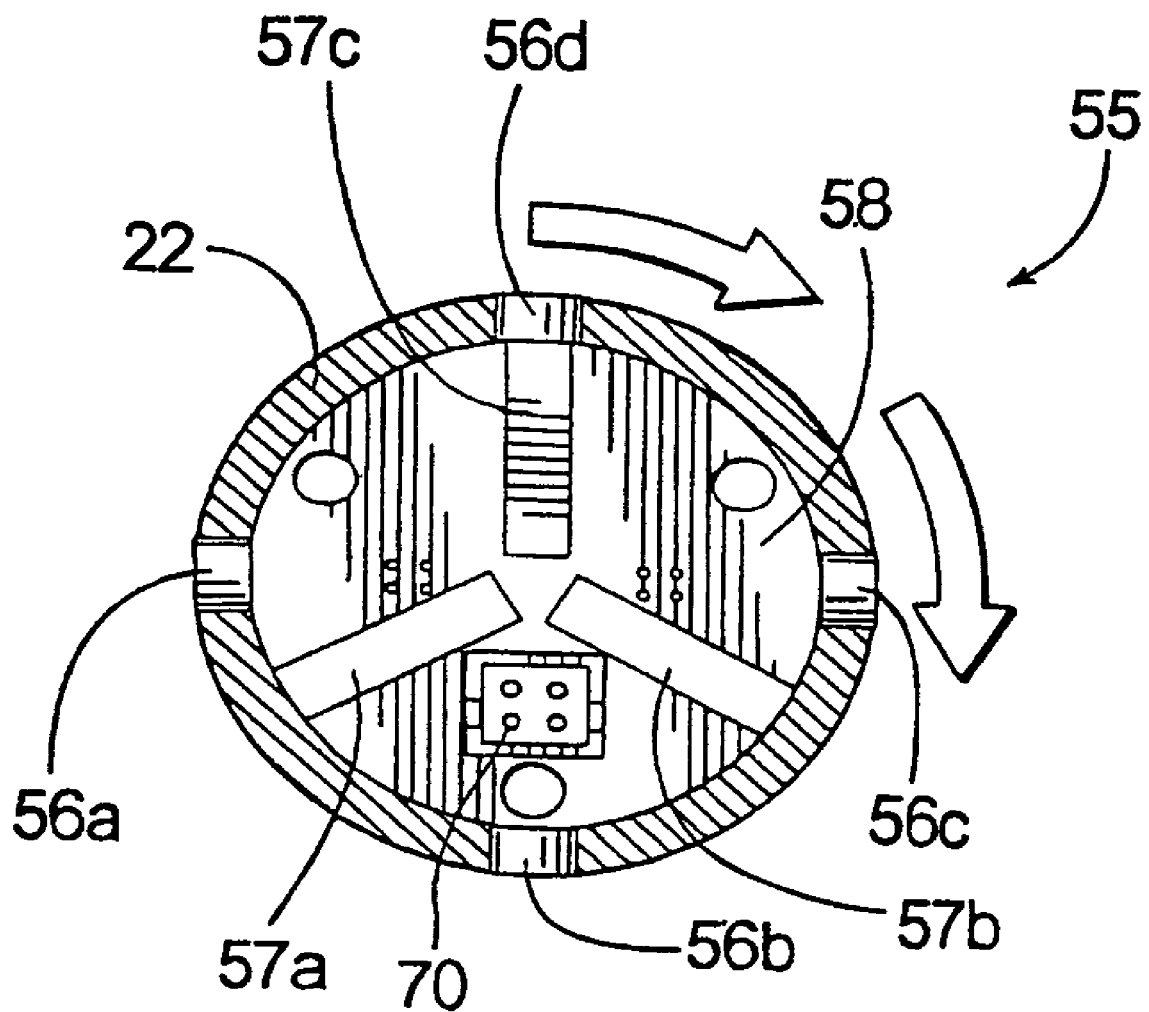
FIG. 4 is a cross sectional view taken at the sensors as shown in lines 4-4 of FIG. 1.

FIG. 4 shows a cross section of one embodiment of the invention, i.e. a cross section 55 as along lines 4-4 of FIG. 1. Magnets 56a-d are located at four points equidistant around the periphery of the rotating member 22. Switches 57a-c are shown as three switches equidistant from each other, around the periphery of the strut 58. Rotation of the magnets 56a-d past the respective switches 57a-c results in the generation of electronic pulses as further described below.

Clearly, other embodiments of the invention not specifically illustrated could employ emitters and sensors that are not magnetically operated, but instead rely upon optical light transmission, mechanical effects, vibration, or other means to emit a signal that is capable of being received by a detector or sensing means, and thereby mark and/or measure rotational movement.

When pulling units of product from the product roll 46, the product core 48 rotates. Since the grips 30a-b of the spindle 30a-b are engaged with the product core 48, the rotation of the core also causes rotation of the rotating member 22. One full rotation of the product core 48 is equal to one full rotation of the rotating member 22 of the spindle. When the rotating member 22 turns, embedded magnets 56a-d move into proximity of switches 57a-c which are arranged at 120° intervals at the end of the barrel 25. When one magnet 56a-d passes one switch 57a-c, one signal is generated. In some embodiments, switches called "reed switches" may be used, but in other embodiments other types of switches can be employed. Therefore, twelve signals are generated when a full rotation is completed, using the particular embodiment shown in the Figures. However, other embodiments using different numbers of switches and/or magnets could be employed. Direction of rotation is apparent to the software by analysis of the sequence of sensor signals. The free rotation of the rotating member around the barrel may be ensured by applying anodized coatings to the inner surface of the rotating member 22 and the outer surface of the barrel 25. Data port 70 provides an exit point for a data signal to be transmitted into the cradle (not shown).

Figure 5:
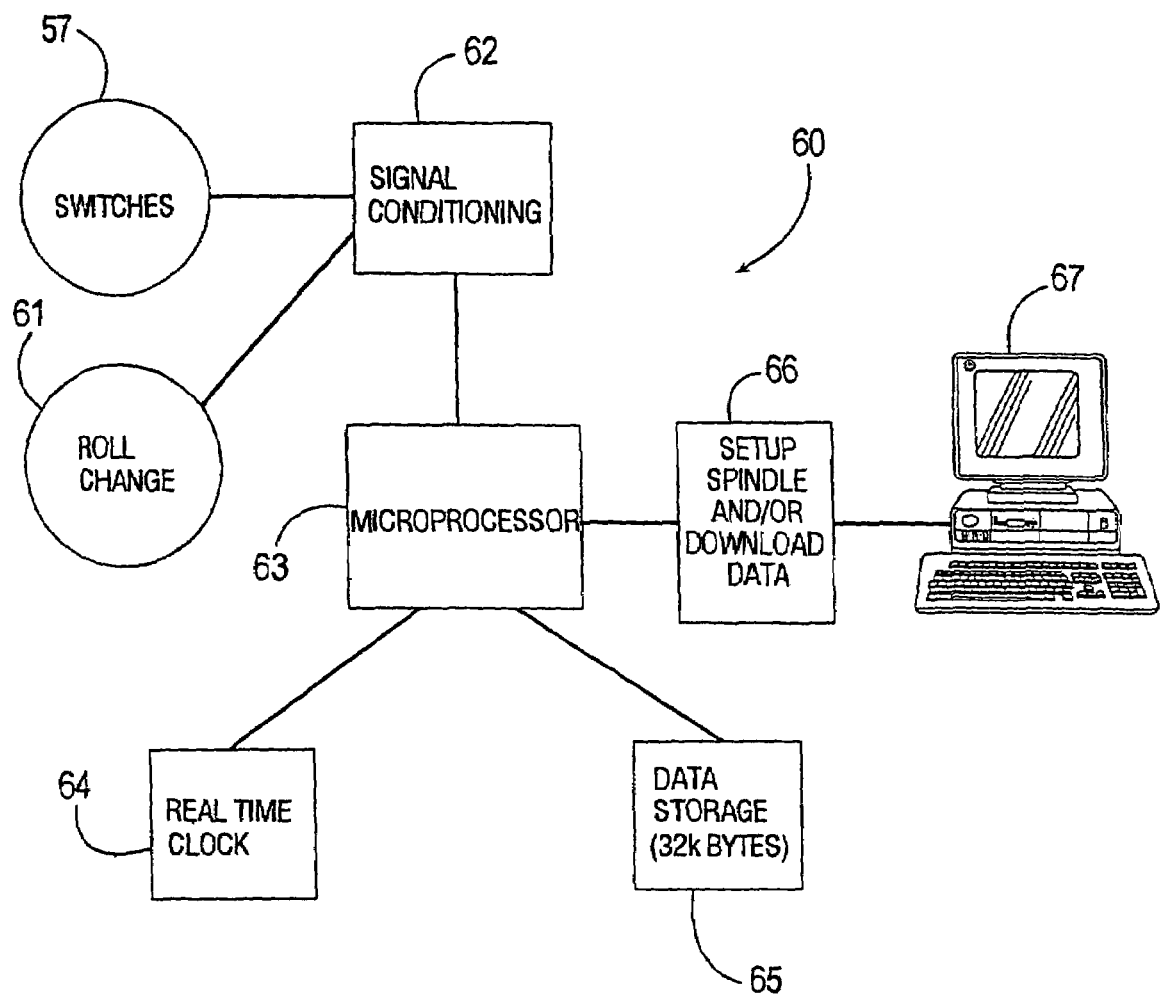
FIG. 5 shows a schematic of the relationship between major components that may be used in the practice of the invention.

FIG. 5 shows a schematic 60 revealing the relationship of components in the application of the invention. First, switches 57 (sometimes called sensors or relays) generally are capable of transmitting electronic signals representing the degree of movement of a rotating member. Signals are conditioned at shown by signal conditioning step 62 when the signals are sent to the microprocessor 63. Signal conditioning is analysis by the firmware (commands stored in the microprocessor 63) to discriminate noise from signals. It instructs the firmware to ignore small inconsequential movements of the rotating member 22 which comprise less than a specified or predetermined number of signals and to consolidate backwards and forwards roll movements that occur within a single event. Once the firmware decides the signals are properly recordable, the direction of pulling, count of signals and time of the event are recorded in data storage.

Furthermore, another input source is a signal representing whether or not there has been a roll change 61. When the spindle assembly 21 is compressed lengthwise more than about 5 mm, the magnet 61b in the spring housing 27 comes closer to the switch 61a located near the end of the circuit board and/or recording device 24. Such closure generates a signal which will be sent to microprocessor. The firmware of the microprocessor then may retrieve the time from the real time clock and record the timed event on the data storage 65.

Signals representing data may exit the microprocessor through the data port 70 to the input output cradle (not shown) at location 66, which may for example include the downloading of data or the set up of a spindle to computer 67. The input output cradle used at location 66 is a convenient reliable device. It provides a fast connection from the computer 67 to individual spindle assemblies 21 for set up with test parameter information from spreadsheets. After the spindle has been used the cradle (not shown) also facilitates the use of a preset validation routine testing several spindle functions. During analysis, the validation routine must be completely and correctly contained on the spindle for the data thereby obtained from the consumer or testing event to be considered valid. The cradle also is capable of monitoring the battery power of the spindle to ensure it retains adequate battery power for further consumer placements. The cradle also downloads data from the spindle assembly 21 to the computer 67 for storage and analysis.

Figure 6A:
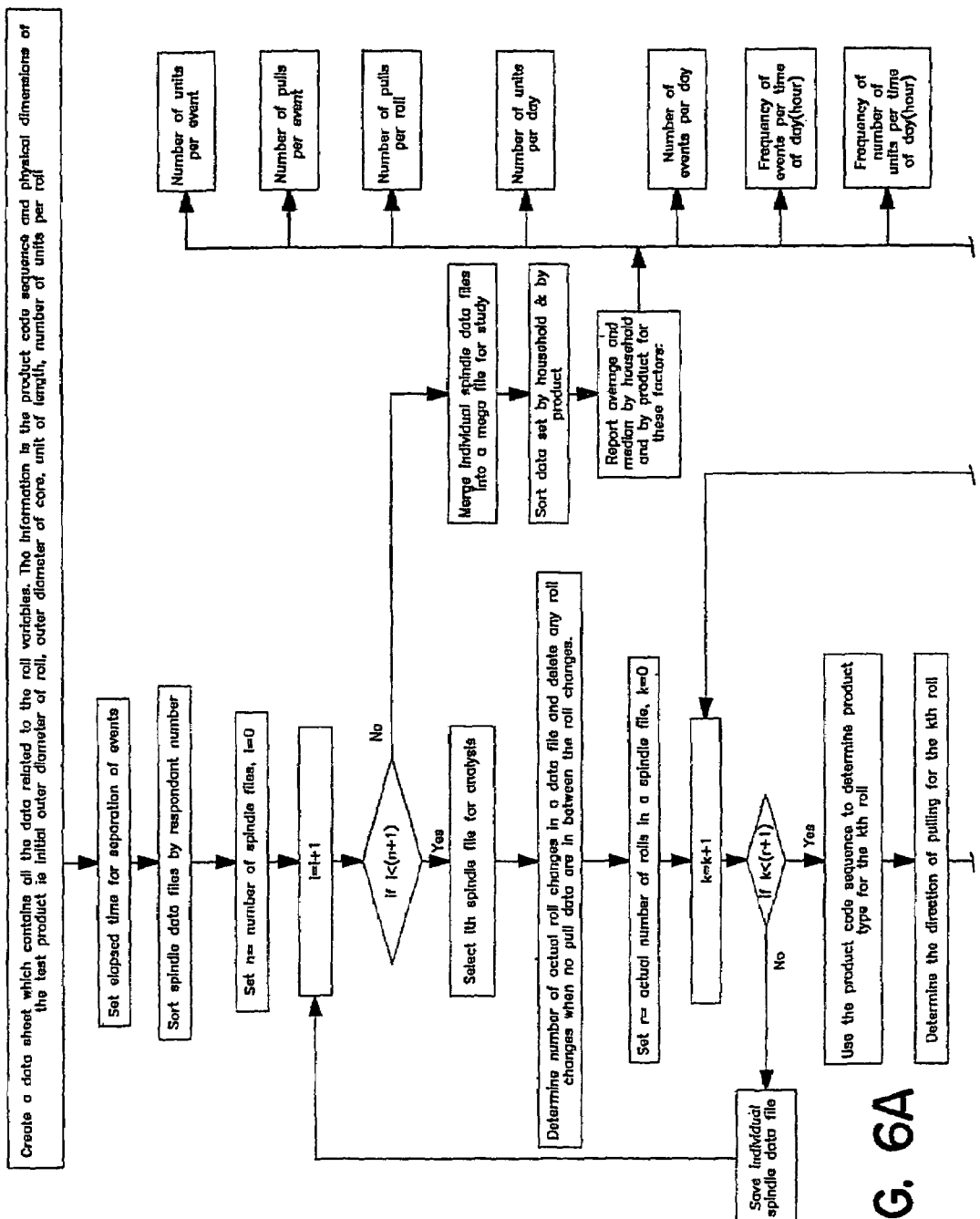
FIGS. 6A and 6B combine to form a functional flow diagram showing the sequence of events that may be achieved using the apparatus, system and method of the invention, with the parameters that may be generated (and data stored for each parameter) as shown on the right side of the FIGS. 6A-B.
Figure 6B:
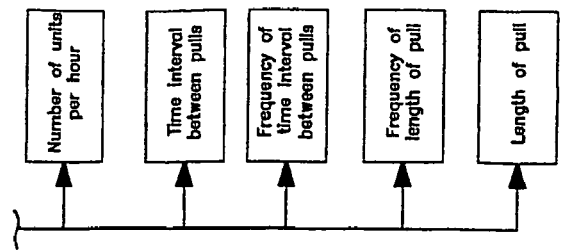
Figure 6B:
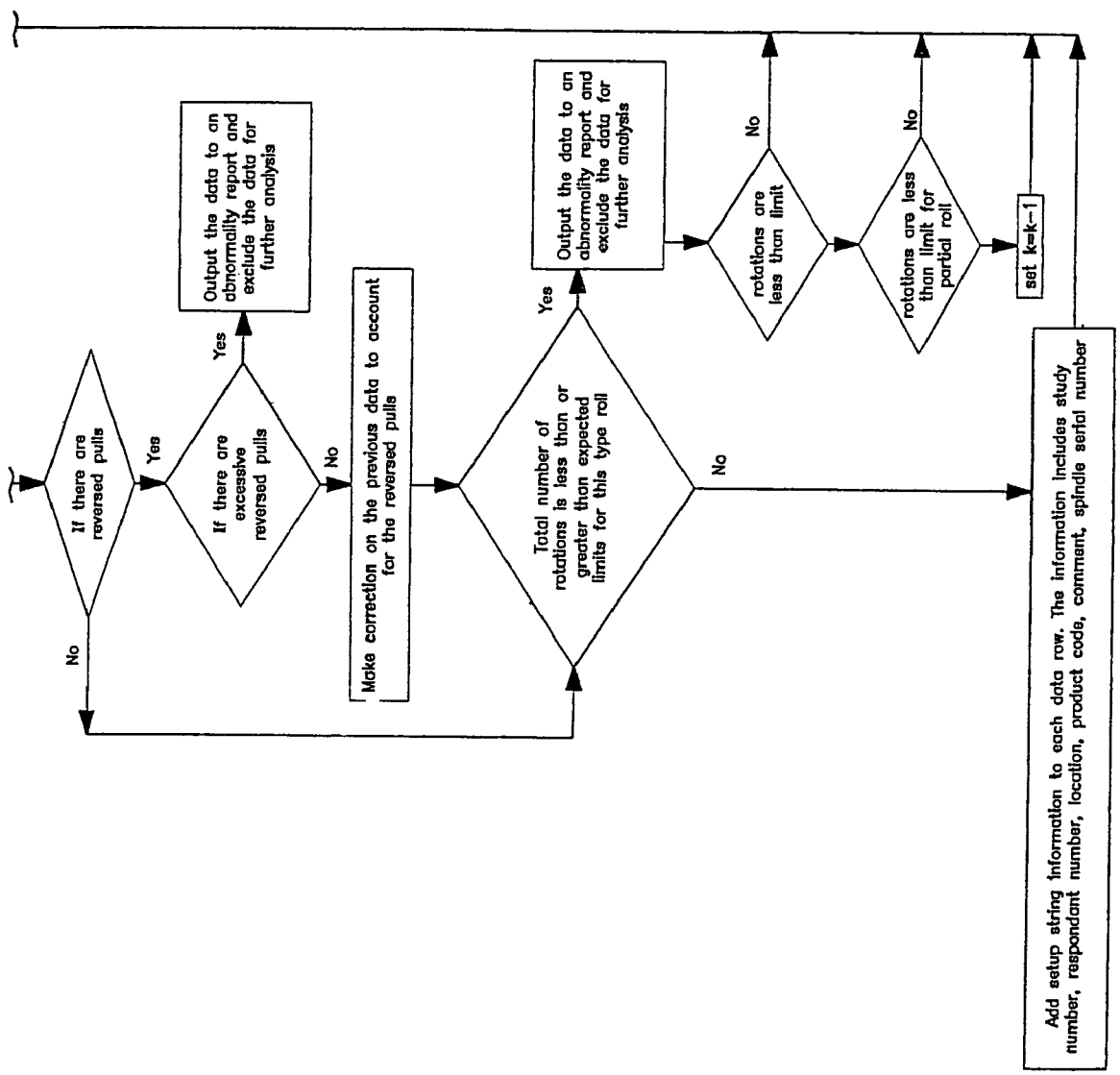

Turning to FIG. 6, a schematic showing a typical analysis for pull data is shown, with the parameters that may be determined shown at the right of the Figure. First, at the top of FIG. 6 a data sheet is pre-created. The data sheet contains product code sequence and the corresponding information for multiple types of rolls used in a consumer home. According to the product code sequence the input data related to any particular roll may be considered. Such input data includes initial outer diameter of the roll, the outer diameter of the core, the length of each unit, and the number of units per roll. A preset time interval for separation of events is determined. The data files generated by all the households are presorted and stored in a designated directory.

The number of spindle data files are located, and then the sequence of rolls used in any particular data file is determined. Once the type of roll is determined, analysis can be done for each roll. For each roll used, it is possible to determine the direction of the pulling, and if there are reversed pulls or excess pulls for each roll. If there are reversed pulls then the reversed pulls are used to correct the previous pull data. If the reversed pulls appear to be excessive, then the excessive reversed pull data are sent to an abnormality report and the data are excluded from final analysis unless readmitted after a manual examination of the abnormality report data. The reversed pulls could happen, for example, when the user tries to find the end to start pulling or rewinds the excessive pulled product back to the roll or the product roll is simply unwound by minors or pets and perhaps rewound back onto the roll by someone.

If there are no excessive number of reverse pulls, then the total number of rotations is compared to the expected rotations for a roll, and if it exceeds or falls short of the latter by an established limit, then the data is sent to an abnormality report and excluded. However, data could be manually inspected and readmitted if deemed reliable. After the data are treated with the above techniques and it is determined there are no reversed pulls or excessive pulls, then information is added to each row of data to prepare for sorting and compiling summary data sets. The information added includes study number, respondent number, location, product code, comment, and spindle serial number. The process will repeat until all the rolls in an individual data file are examined and the individual data file is saved. Repeated examination and addition of the test information will be performed successively to the next spindle data file until all files in the directory are examined.

After all the individual spindle data files are examined and saved, the data files are merged into a larger mega file for study. Then, data is sorted by household and by product, for ultimate display or further calculations or method steps.

The parameters that may comprise output variables which can be tabulated, displayed, stored, or otherwise made available as an output signal include mean (i.e. average) and median of the following: the length of pull, the number of units per event, the number of pulls per roll, the number of units per day, the number of events per day, the frequency of events per time of day (hour), the frequency of the number of units per time of day; the number of units per hour, the time interval between pulls, the frequency of time interval between pulls and the frequency of length of pull. This list of relevant parameters is by no means exhaustive, and programming could easily be developed to calculate, tabulate, or store other variables that may be needed in a given application.

In consumer testing of paper tissue, output parameters are useful to compare households and tissue variables. The time of day for frequent use can be seen and the sheets used during this time help to differentiate usage patterns for households. It is also possible to see patterns related to individual habits within a household, which enables the grouping of like or similar households on the basis of product use.

Product usage characteristics related to product properties can also be examined. The amount of product removed from the roll for use can be modeled by product type, product characteristics, measuring unit size and roll characteristics. Optimum utility in terms of minimum units per use can be sought as a function of measuring unit size, bulk, roll size and core size, or other parameters that could be important.

Respondent compliance with a multi-variable test can also be accessed using the spindle data. The spindle data indicates how much of a tissue variable was used, and when the tissue variable was used in the consumer use test. For example, if a paired test is being run the data from the spindle assembly 21 confirms both variables were in fact used by the respondent (i.e. consumer providing test data).

Figure 7A:
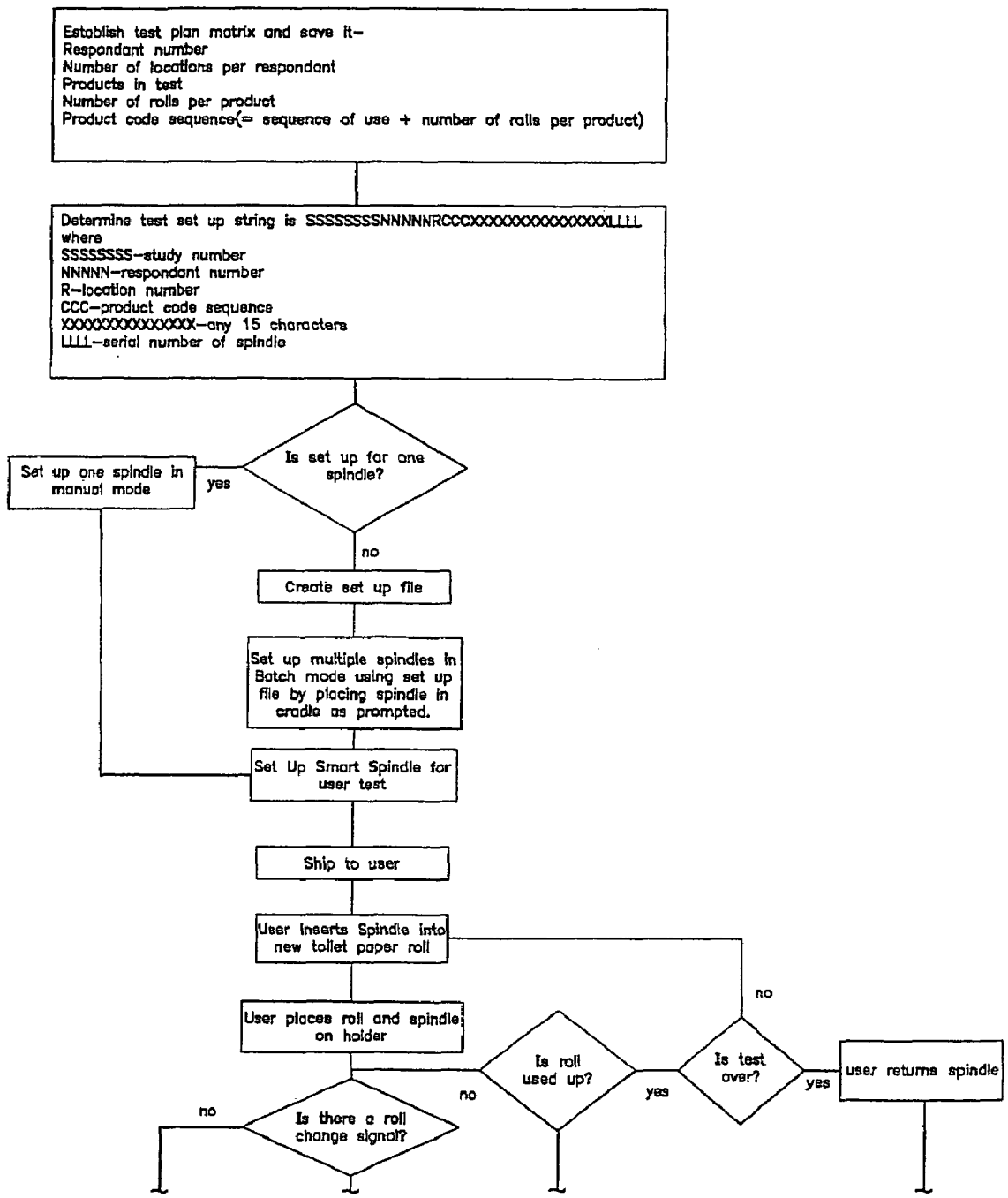
FIG. 7A reveals how the spindle apparatus may be used to determine parameters related to toilet paper use and utility in the home.

In FIG. 7A, the use of a spindle system such as the spindle assembly 21 or system shown above is detailed for use in a consumer home. The invention is in no way limited to use with toilet tissue in a residence or home, and could easily be used anywhere a spindle can be employed for releasing any rolled product, paper, synthetic, textile or otherwise.

First, in the case of paper toilet tissue, or paper toweling, spindles may be distributed to consumers in connection with a promotion, or on a trial basis, with or without payment. In any event, once consumers are selected, and the spindles are distributed, data could be generated and recorded using the spindle assembly 21, for later use of the data.

Prior to distributing the spindle assembly 21 to consumers for use, several steps could occur as shown near the top of FIG. 7. First, a test set up string may be predetermined, and set up for the spindle assembly 21. Then, a set up file could be created, and spindles either one at a time, or in groups, could be set up by placing the spindle in a cradle (not shown), which when connected to computer 67 inputs data electronically to the spindle assembly 21. Then, after the spindle is set up, it could be shipped to a user or consumer. An alternative to the set-up file is core labeling which is read by the optical scanner into the database. The optical scanner can be contained within the spindle assembly 21 or used manually when product is sent out for a product test or when the product is loaded onto the spindle assembly 21.

Once the spindle assembly 21 is placed into a user bathroom, the roll and spindle assembly 21 are placed on a holder. The method steps or pathway as shown in FIG. 7A can be employed, such that if and when a roll is used up, the test may be over. Then, the user returns the spindle assembly 21. However, if the roll is used up and the test is not over, then it merely indicates that the consumer is replacing a used roll with a new roll of toilet paper. Then, data collection may begin again, for each roll.

Parameters as previously indicated in FIG. 6A-B may be determined by the rotational characteristics of the roll, as recorded by the recording device 24 previously shown in FIG. 1. For each roll change, a date and time stamp data portion is recorded. Then, the signal is added to an appropriate register, or provided as an output to activate or signal a receiver. In some particular applications of the invention, the data may be sent out to a recording device 24.

Figure 7B:
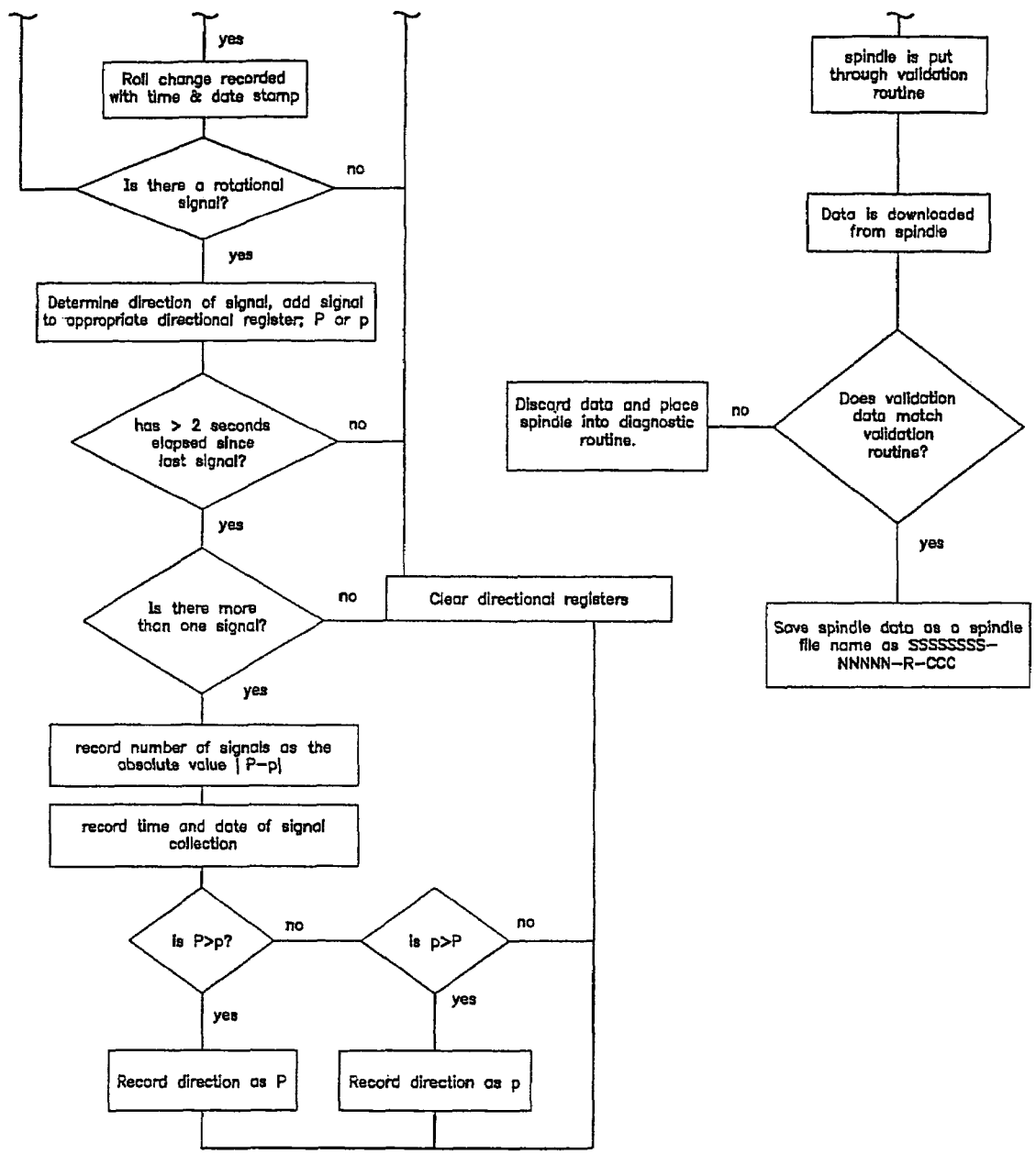
FIG. 7B reveals further steps (continuation of FIG. 7A) that may be accomplished in the practice of the invention.

As shown on the right side of FIG. 7B, when data is downloaded from the spindle, the spindle may be put through a validation routine by the cradle. In general, a validation routine is a routine that determines whether or not the data recorded on the spindle is "good" data (that is, accurately reflects what it purports to reflect, and is deemed reliable enough to save and use). The functional flow diagram and data flow is shown near the middle and lower portion of FIG. 7B, and the result is that the spindle data is saved. In some applications, the data may be sent to provide a signal, and not permanently saved.

In general, a validation routine may assist in determining if the spindle is recording accurate data. Then, the validated data is downloaded from the spindle, and if the validated data matches the validation routine, the data is added to a spindle analysis program. The data may be sent to a computer. If the validation routine is not verified on the spindle then the spindle data is excluded and the spindle sent for diagnostics and repair.

In one specific application of the invention, a signal could be used to notify another location of the supply condition, or usage, of the roll. This signal could be sent by a conventional wire telephone, cellular telephone, radio signal, electrical wire, or other communication mechanism. The result is that a bell could be rung (i.e. an audible signal), or a display could activate, or an entry could be made in an electronic or physical ledger, noting the status of the supply condition. Sometimes, a microprocessor could be involved to make certain threshold determinations of whether or not, and when, to send a signal. In more robust applications, a computer could be involved, giving the researcher more control and flexibility in how he or she wishes to put the data to use. In other systems, a signal might be automatically sent when a predetermined supply level is reached. Thus, cost considerations and the specific application in which the invention is deployed will dictate the level of sophistication used in saving or using the data.

Figure 8A:
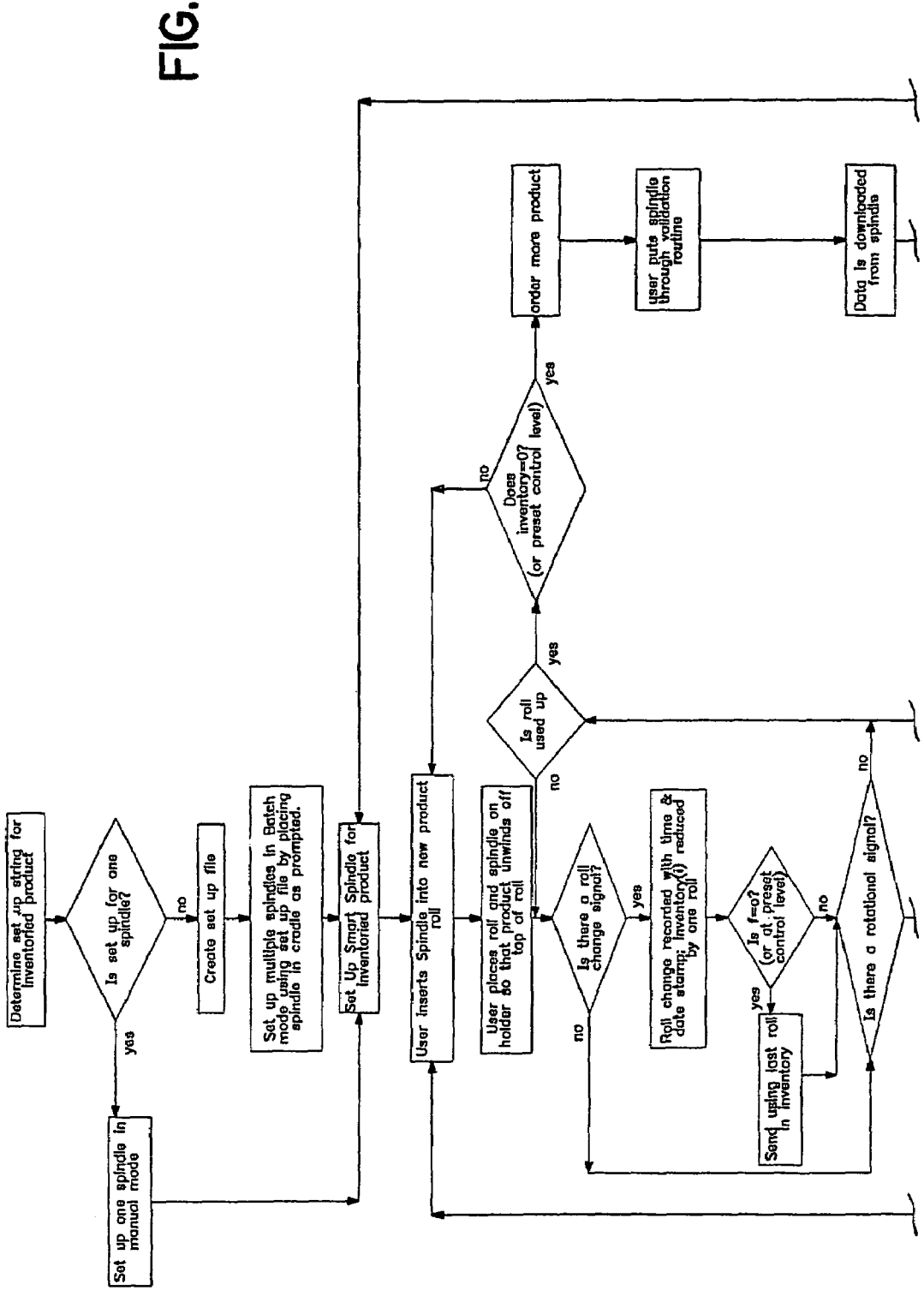
FIG. 8A shows a system for controlling inventory in a consumer home, factory or retail store.
Figure 8B:
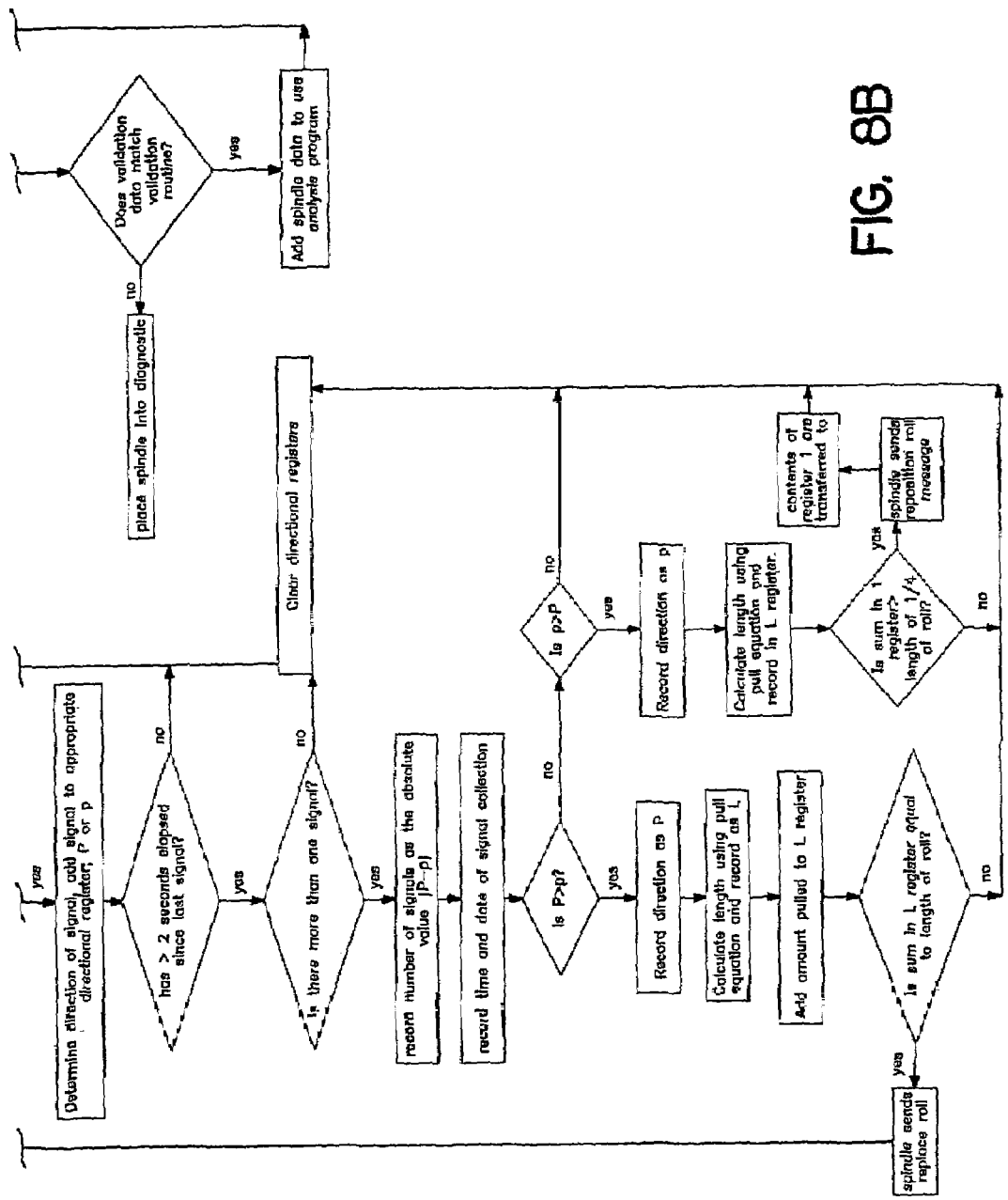
FIG. 8B is a schematic which continues the system of FIG. 8A, and generates data for an analysis program.

Thus, it is possible to use the spindle assembly 21 to control an inventory of a rolled product in a consumer's home, in a factory, or in a commercial setting, such as a retail store. For example, as shown in FIGS. 8A and 8B, it would be possible to determine when the inventory reaches a predetermined minimum or threshold value (preset control level), and once that occurs to send an audible, electronic, or other type of signal to be displayed or sounded to notify the user, attendant or custodian regarding the low supply situation. In some cases, the signal could comprise an alert that prompts a human to replenish an inventory amount.

This inventory replenishment could occur, for example, in an office building in which a main janitorial room or control center would have lights, bells or the like that could receive and/or display data on a simple display or even a computer monitor. This signal could indicate the roll supply situation available in public restrooms throughout the building.

In another setting, a factory that releases product from a roll or spool in the course of manufacturing articles could use the invention to notify factory personnel, or even a distributor/vendor of the product rolls, that a low supply situation exists. Again, any electronic, auditory, or visual means of sending such a supply status signal could be employed.

In a factory, any material that is dispensed from a roll dispenser could be electronically matched to an electronic system or inventory replenishment program which would automatically replenish the inventory when the inventory reaches a predetermined threshold minimum. An automatic means of identifying the product (such as a Uniform Product Code reader) could be employed. It is possible to provide the code in connection with the core (in the case of both tissue or paper toweling) for industrial use as well as home and utility testing.

In other retail or wholesale applications, the sale of fabric, rope, cordage, chain, woven fabrics, wire, tape, banding material, yarn, nonwoven filaments or webs, and the like could occur such that when the amount remaining on the roll reaches a threshold minimum, a store manager or vendor is alerted of the supply status (i.e. that the roll needs to be replaced, or that more rolls need to be shipped or manufactured). In other applications, it would be possible to provide a wire or wireless signal by telephonic, radio transmission, or other means to directly notify a manufacturer or computer in the manufacturer location of the existing inventory level, and/or automatically place an order for new material to be shipped. In any event, one purpose of such a system could be to order more product once it is detected that the product inventory amount is below the preselected threshold amount, which may determined by a comparison step.

A person of skill in the art, upon reading this specification and understanding the details of the disclosed apparatus and system, could design such a method or system. This inventory replenishment could occur in the retail, factory, or consumer setting. These are merely examples of the methods by which inventory could be controlled, and other applications of the invention could be ascertained by a person of skill in the art.

EXAMPLE

Figure 9:
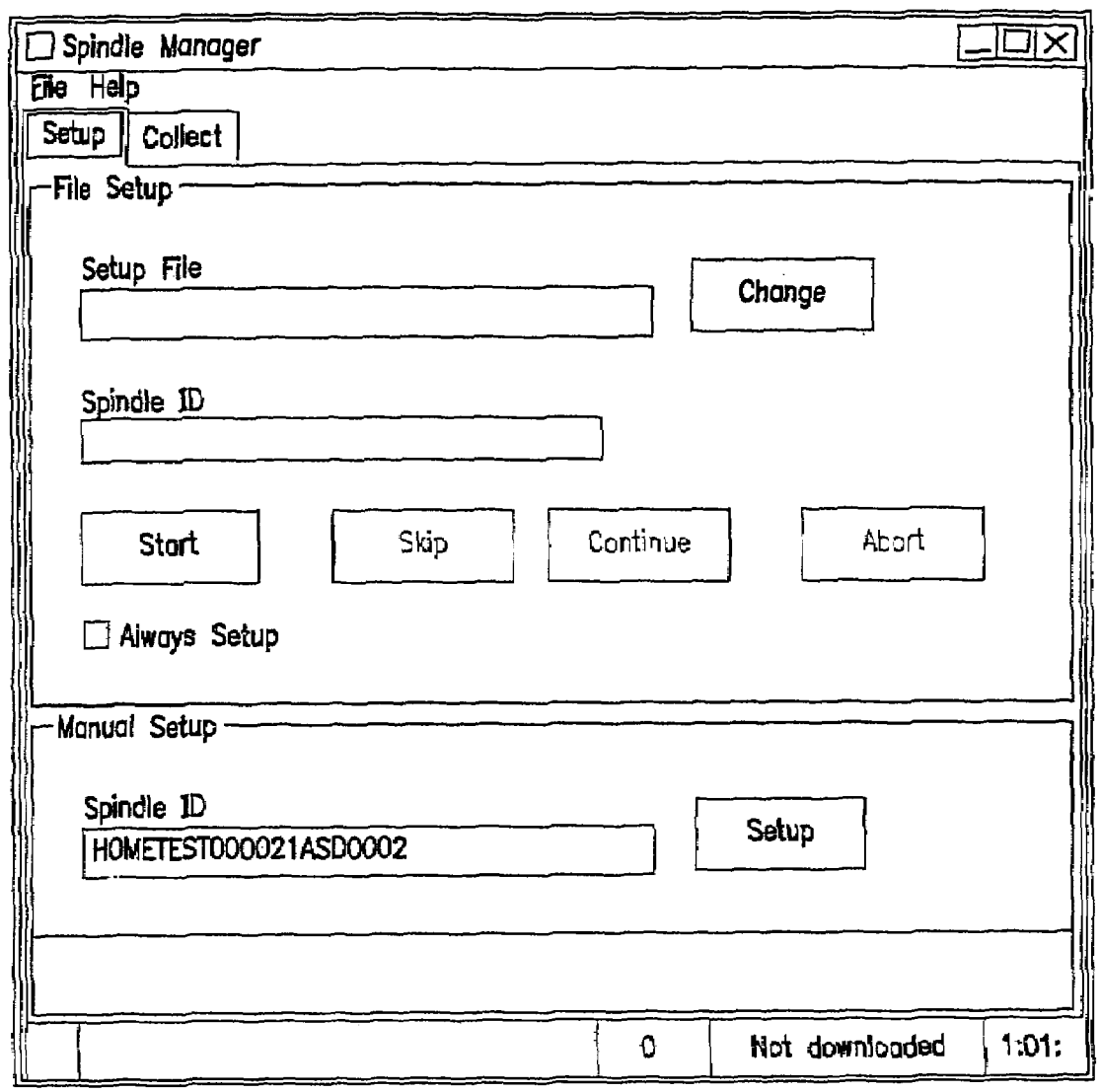
FIG. 9 shows a representation of a computer screen employing a software management program that allows test identification information to be placed and stored relating to the apparatus of the invention.

A spindle manager software program can be used to set up the spindle assembly 21 and to upload data from the spindle assembly 21 once the data is obtained by the spindle assembly 21. In FIG. 9, one example of such a spindle manager program is shown. First, to set up the spindle, one could click on the "set up" tab, so that the spindle could be set up individually or in a batch. For an individual spindle set up, the format for setting up the spindle could be as follows:

1. Assign Characters
SSSSSSSSNNNNNRCCC Any 15 chars
Where
SSSSSSSS=Study Number
NNNNN=Subject Number
R=Bathroom Number
CCC=Product ID
LLLL=Spindle ID
Any 15 Chars=A free field for 15 characters 2. Collect Data
For uploading data from a single spindle, a user may select or click on "Collect" to collect data and "View" to view the data in the text window and "Save" to save the data in a CSV file. A CSV file is a special text file that has commas to separate fields in each line of data. The file with CSV format can be read, for example to the MS Excel spreadsheet directly without going through options required for reading a regular text file in MS Excel. The name of the CSV file is given automatically as SSSSSSSS-NNNNN-R.CSV, as one example.

For uploading data from a batch of spindles, a researcher or user may specify the directory for the batch of files to be stored. This may be accomplished by starting the batch collection by clicking on "Start". The name of the file will be displayed in the "Save to File" text box after data from each spindle is uploaded. Then, the user may click on "Finish" after the last spindle is uploaded.

The spindle analysis program (see FIG. 11 as one example) for analyzing spindle data files contains only one type of product roll, and may be created in Microsoft Excel™ using Visual Basic for Application (VBA). Microsoft Excel™ is manufactured and distributed by the Microsoft Corporation. "Excel" is believed to be a trademark of the Microsoft Corporation.

The spindle analysis program may use several spreadsheets, and in the example shown utilizes spreadsheets including: "StartSS", "TissueInfo" and "Summary", as examples. The "TissueInfo" spreadsheet contains information required for calculation. The information is product identified, including the name of the product (in this particular instance, a toilet tissue), an outer diameter of full roll, outer diameter of the core, length of tissue, number of sheets in a roll, and the like.

The procedure of running the example program, in one embodiment of the invention, is as follows:

1. Select spreadsheet "StartSS"
2. Click once on the string "StartSSProgram" See FIG. 12.
3. A panel with four push buttons will appear on the computer screen. These four selections include "Select File", "Set Up Test", "Start Analysis" and "Exit". (See FIG. 13).
4. Click on "Select File" to select the file to be opened. Change "Filed of type" to CSV File (*.csv) to view the data files. Once the file is selected, a message will appear to confirm the selection.
5. Click on "Set Up Test". A "Test Setup" panel will appear. Then, one may verify the information displayed in the panel. There are six data fields in this particular example (See FIG. 10), namely Study #, Subject #, Bathroom #, Product identification (Id), Spindle Id, and Criterion for Visits. The "Criterion for Visits" represents the time that has elapsed between two consecutive visits or bathroom events. Once the verification is done, the user may select "OK" to exit the panel.
6. Click on "Start Analysis". A message will appear after the analysis is complete.
7. Exit the program to view the result file.
8. Save the file as an XLS file. An "XLS" file is a regular MS Excel file with file extension of ".xls".

Figure 10:
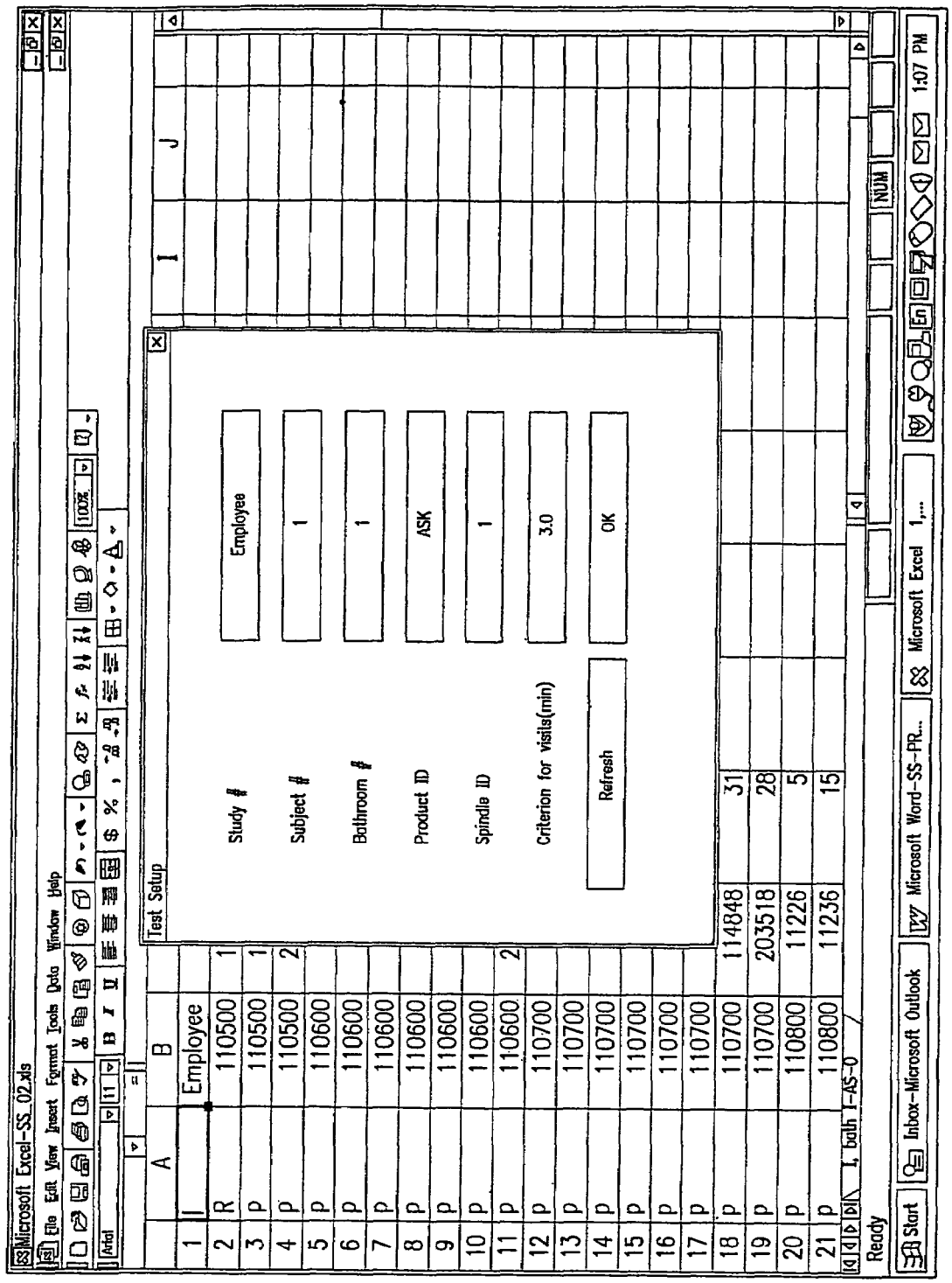
FIG. 10 shows an automated test set up procedure for entering and recording data generated by spindles.
Figure 11:
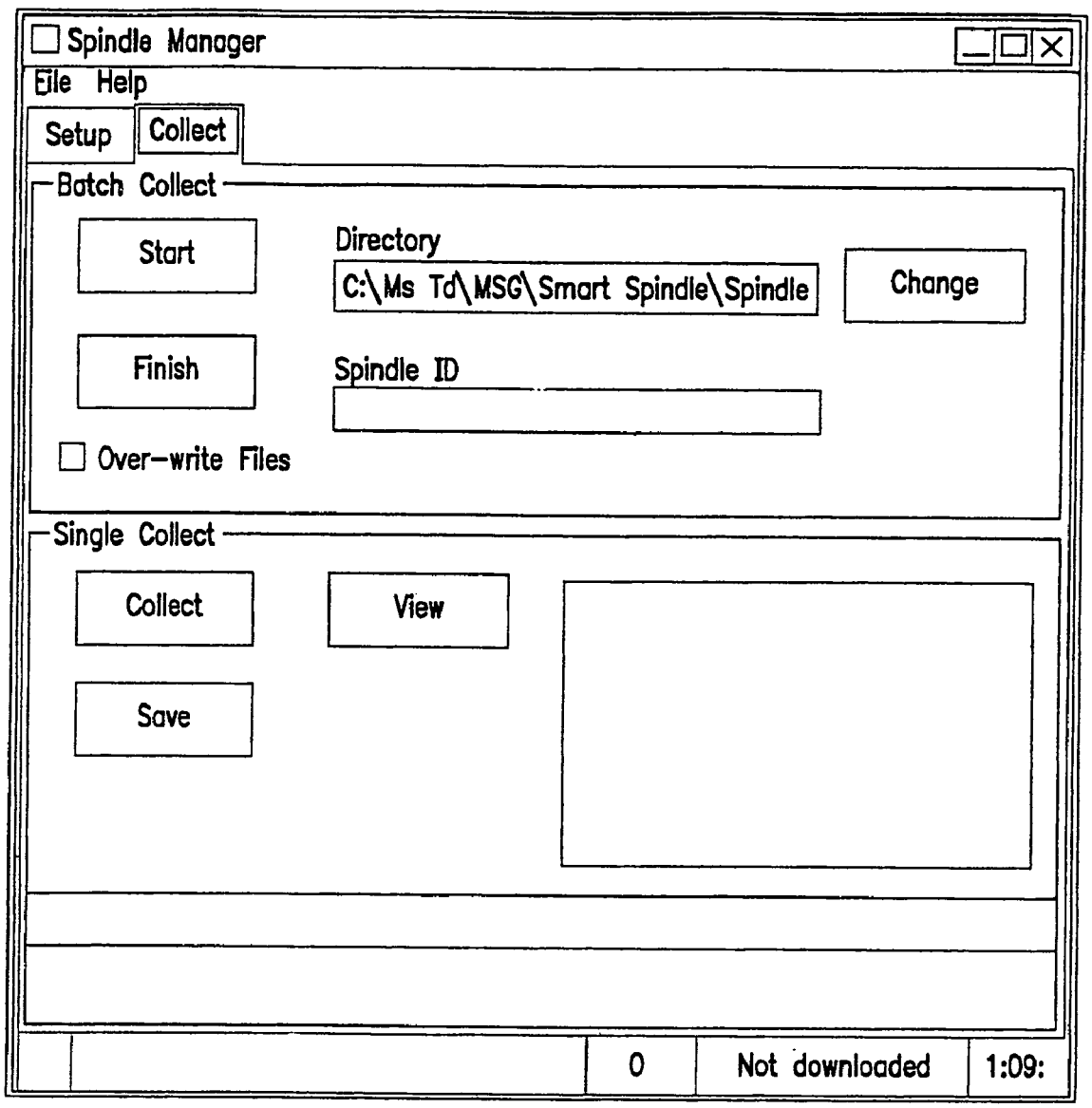
FIG. 11 shows a software management program that provides a method to retrieve and save to memory data generated by and stored by the apparatus.
Figure 12:
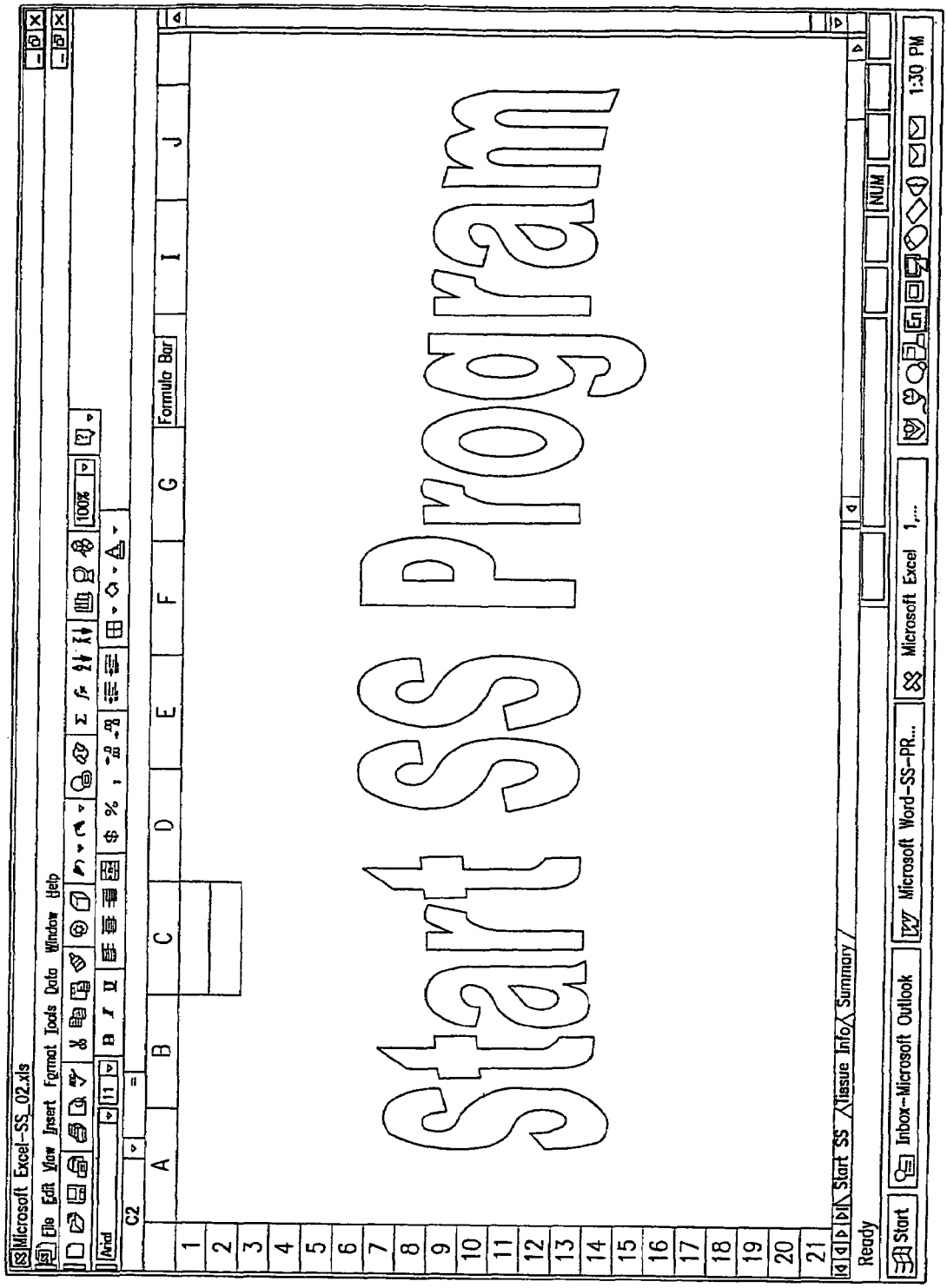
FIG. 12 shows a feature screen for a program that is but one example of how the invention may be employed using at least three spreadsheets, "StartSS", "TissueInfo", and "Summary"
Figure 13:
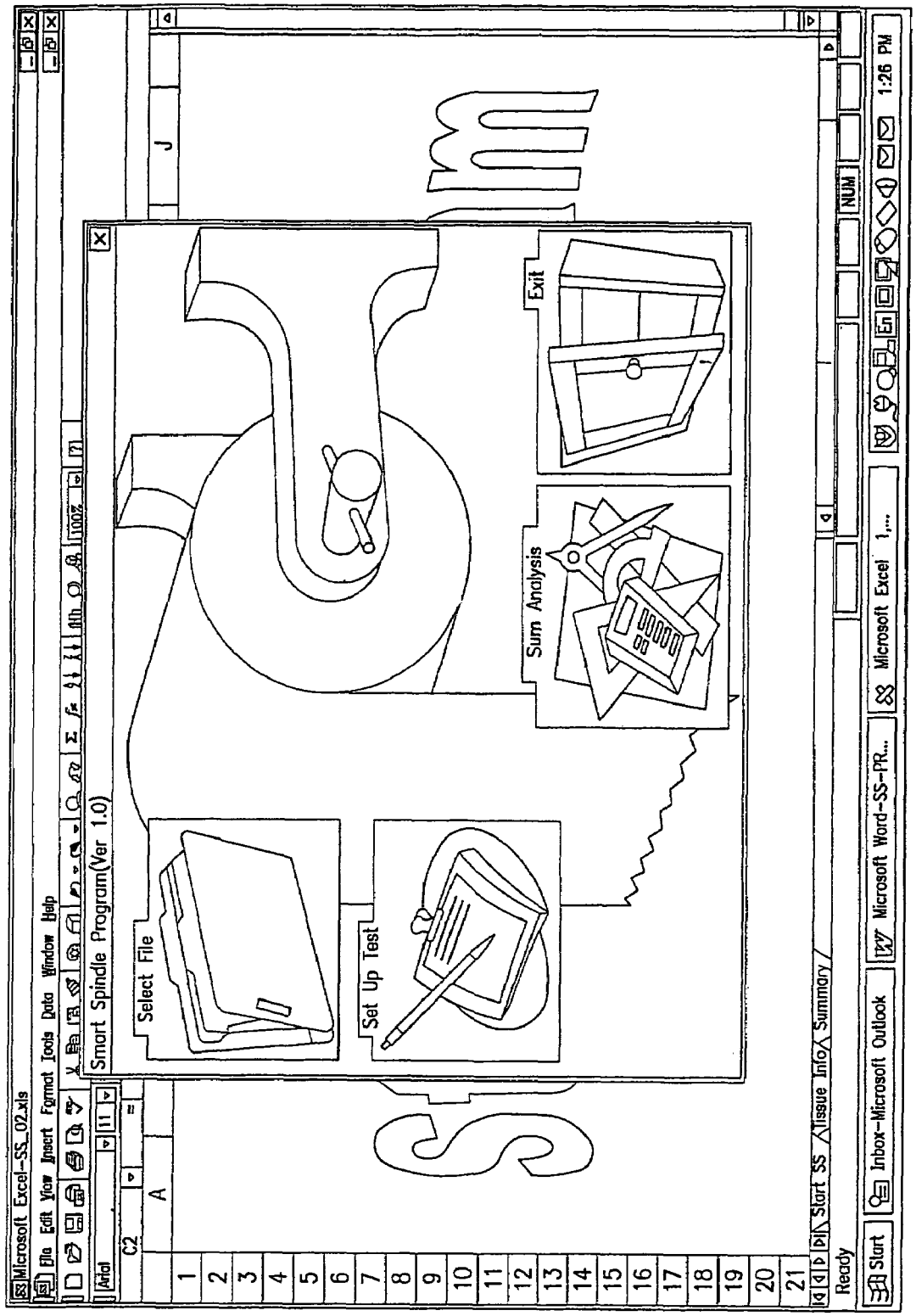
FIG. 13 reveals a panel with four selections, providing the operator with the option to select a file, set up a test, start an analysis, or exit.

For batch setup, as illustrated in FIG. 10, a text file (Setup File) is required to set up a batch of spindles. The file contains lines of data with the above format. One line represents one spindle, but other configurations could be employed.

The spindle assembly 21 can measure the number of revolutions of a spindle, and store the information in internal memory where it may be retrieved later. It may be possible to store up to 8000 pull "events". Each event may be time and date stamped.

The electronics assembly of the spindle apparatus 21, in one embodiment, may consist of a circuit board containing the following:

a. Microcontroller with embedded firmware.
b. Serial EE memory device with a 32 k byte capacity.
c. Real time clock to keep time and date.
d. Sensors for detecting rotational movement.
e. Serial communications for connecting the spindle indirectly to a data output receiver, such as for example, a personal computer.

Many commercially available computing systems could be employed, as recognized by a person of skill in the art. The electronic control system typically is powered by a 3.7 volt lithium battery (such as indicated in the Figures as battery 29).

The electronic components as previously described may be coated with an acrylic protective layer to prevent damage by high levels of humidity or short-term immersion in water. They may be housed in the inner tube and are not visible or accessible to the user, to protect the system.

A serial link from a computer to the spindle can allow for administration operations to be completed. A spindle manager program such as shown in this specification running on a computer communicates through a serial link with the spindle via a cradle to allow the following operations to be carried out:

1. Retrieving the stored data.
2. Setting up a spindle for a test.
3. Checking the status of a spindle.

The cradle allows setup and download operations to be carried out automatically by the spindle manager program.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

That which is claimed is:

1. A method for inventory control of a product dispensed from rolls in a facility, the method comprising:
   providing a dispenser in a building having means for detecting a change of a product roll from the dispenser, wherein the means for detecting the change of the product roll includes a data acquisition device having a spindle and a holding device for holding the spindle in the dispenser, the holding device configured such that the product roll rotates about the data acquisition device;
   producing a product roll change signal by the change of the product roll;
   transmitting the product roll change signal to a receiver, the receiver being configured to record the product roll change and including means for controlling a product roll inventory;
   determining the product roll inventory in the building by decrementing from the product roll inventory the product roll change when the product roll change signal is received by the receiver; and
   generating an on-line order for an additional product roll once a predetermined minimum level of the product roll inventory is reached.

2. The method for inventory control as in claim 1, wherein the product roll is one of a sheet material, a toilet tissue and a paper towel.

3. The method for inventory control as in claim 1, wherein the building is one of a factory, a store and a home.

4. The method for inventory control as in claim 1, further comprising notifying a user in the building of a validation failure of the dispenser and scheduling a repair or replacement of the dispenser.

5. The method for inventory control as in claim 1, further comprising triggering a product roll change signal by removing the spindle from the holding device.

6. The method for inventory control as in claim 5, wherein the data acquisition device further comprises means to prevent transmitting erroneous roll changes.

7. The method for inventory control as in claim 6, wherein the means to prevent transmitting of erroneous roll changes comprises requiring a minimum time to lapse before transmission or recognition of a subsequent signal from the holding device.

8. The method for inventory control as in claim 1, wherein the means for controlling the product roll inventory is a computer having a software program loaded therein, the software program being in communication with the receiver and capable of determining instantaneously the product roll inventory.

9. The method for inventory control as in claim 1, wherein the predetermined minimum level of the product roll inventory is periodically set by a user or programmed in the receiver.

10. The method for inventory control as in claim 1, further comprising shipping the additional product roll to the building upon receipt of the on-line order.

11. The method for inventory control as in claim 1, further comprising inputting the additional product roll into the product roll inventory.

12. The method for inventory control as in claim 11, further comprising updating the product roll inventory upon receipt of the additional product roll into the product roll inventory.

13. The method for inventory control as in claim 1, further comprising manually updating the product roll inventory upon receipt of the additional product roll by a user in the building.

14. The method for inventory control as in claim 1, further comprising generating an additional product roll signal upon receipt of the additional product roll into the product roll inventory and automatically updating the product roll inventory.

15. The method for inventory control as in claim 14, wherein the additional product roll signal is produced by a distributor of the product rolls.

16. The method for inventory control as in claim 1, further comprising billing a user in the building for the product roll decremented from the product roll inventory.

17. The method for inventory control as in claim 1, further comprising disposing the receiver remote from the building.

18. The method for inventory control as in claim 17, wherein the receiver is in wireless communication with the building.

19. The method for inventory control as in claim 1, further comprising validating the product roll change signal before sending the on-line order.

* * * * *

UNITED STATES PATENT AND TRADEMARK OFFICE
CERTIFICATE OF CORRECTION

PATENT NO. : 7,590,467 B2
APPLICATION NO. : 11/443573
DATED : September 15, 2009
INVENTOR(S) : Holt et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 415 days.

Signed and Sealed this

Twenty-first Day of September, 2010

David J. Kappos
*Director of the United States Patent and Trademark Office*